United States Patent [19]

Kobayashi

[11] Patent Number: 4,794,253

[45] Date of Patent: Dec. 27, 1988

[54] ION SOURCE FOR MASS SPECTROMETER

[75] Inventor: Tatsuji Kobayashi, Tokyo, Japan

[73] Assignee: JEOL Ltd., Tokyo, Japan

[21] Appl. No.: 61,464

[22] Filed: Jun. 15, 1987

[51] Int. Cl.$^4$ .............................................. B01D 44/00

[52] U.S. Cl. ...................................... 250/288; 250/281

[58] Field of Search ................ 250/281, 282, 288, 423

[56] References Cited

U.S. PATENT DOCUMENTS

| | | | |
|---|---|---|---|
| 3,997,298 | 12/1976 | McLafferty | 250/288 |
| 4,112,297 | 9/1978 | Miyagi et al. | 250/288 |
| 4,160,161 | 7/1979 | Horton | 250/288 |
| 4,546,253 | 10/1985 | Tsuchiya et al. | 250/288 |
| 4,607,163 | 8/1986 | Mizuno | 250/288 |

*Primary Examiner*—Bruce C. Anderson

*Attorney, Agent, or Firm*—Webb, Burden, Ziesenheim & Webb

[57] ABSTRACT

There is disclosed an ion source for use in a mass spectrometer. The ion source has an ionization chamber, a pumping means for continuously pumping liquid sample, an inlet tube whose front end is located inside the ionization chamber to introduce the liquid sample delivered from the pumping means into the ionization chamber, a means for ionizing the sample introduced into the ionization chamber, and an exhaust pipe connected with the inlet tube. The ion source further includes a means for applying a pressure on the superfluous sample in the exhaust pipe by employing a gaseous material. Thus, the flow rate of the sample introduced into the ionization chamber through the inlet tube is stabilized.

20 Claims, 3 Drawing Sheets

ION SOURCE FOR MASS SPECTROMETER

FIELD OF THE INVENTION

The present invention relates to an ion source for use in a mass spectrometer in which liquid sample is directly introduced into the ionization chamber to be ionized.

BACKGROUND OF THE INVENTION

Various systems have been proposed for introducing liquid sample into the ion source of a mass spectrometer. One of these systems is disclosed in Japanese Utility Model Unexamined, Laid-Open No. 116065/1986 and schematically illustrated in FIG. 1.

Referring to FIG. 1, the inside of an ion source housing 1 is evacuated. An ionization chamber 2, baffles with slits 3, and a beam generator 4 are mounted inside the housing 1. An inlet tube 5 has one end connected to a liquid chromatograph 6. The opposite portion of the tube 5 extends through an end flange 7 into the ionization chamber 2. A support ring 8 is interposed between the flange 7 and the inlet tube 5. A tube 9 made of stainless steel is mounted around the front end of the inlet tube 5 that is located inside the ionization chamber 2. A porous member 10 is mounted to the tube 9 so as to plug the open end of the inlet tube 5. Since a repeller voltage is applied to the tube 9 via an electrode R, an insulating ring 11 that is mounted in the ionization chamber 2 is fitted over the tube 9. As an example, the porous member 10 is a filter made from a frit as produced by sintering powdered stainless steel. The effluent emerging from the chromatograph 6 is introduced through the inlet tube 5 and the porous member 10 into the ionization chamber 2. The beam generator 4 directs a beam B, such as a neutral particle beam, charged particle beam, or laser beam, onto the porous member 10 to ionize the introduced effluent. The resulting ions I are passed through the slits 3 into a mass analyzer (not shown).

The flow rate of the effluent from the chromatograph 6 ranges from 10 to 100 μl/min., for example, while the flow rate of the effluent that can be admitted into the ionization chamber 2 is approximately 1 μl/min. Therefore, the fraction, i.e., 9/10 to 99/100, of the effluent that cannot be entered into the ionization chamber is discharged to the outside via an exhaust pipe 12 and a flow control valve 13. In this system, either the variations in the flow rate occurring at the flow control valve 13 or the variations in the flow rate of the effluent from the chromatograph 6 due to pulsations produced by the pump that delivers the liquid greatly affects the flow rate of the effluent which is introduced into the ionization chamber via the porous member 10.

It is now assumed that the flow rate of the effluent from the chromatograph 6 is 101 μl/min. and that the effluent passes into the porous member 10 and the exhaust pipe 12 at flow rates of 1 μl/min. and 100 μl/min., respectively. When the flow rate at the control valve 13 changes by only about ±0.5%, or 0.5 μl/min., because of the variations in the operating conditions such as temperature, the change in the flow rate of the effluent introduced into the ionization chamber through the porous member 10 reaches as high as 50%, i.e., 1±0.5 μl/min. A similar undesirable situation takes place when the flow rate of the liquid delivered from the chromatograph 6 varies. Therefore, the amount of the produced ions also varies conspicuously, thereby impeding analysis. Further, many other problems, including large variations in the pressure inside the ion source, take place.

SUMMARY OF THE INVENTION

It is a main object of the present invention to provide an ion source which is used in a mass spectrometer and which can stabilize the flow rate of the effluent continuously introduced into the ionization chamber of the spectrometer.

It is another object of the invention to provide an ion source which is used in a mass spectrometer and which permits the operator to arbitrarily set the flow rate of the effluent continuously introduced into the ionization chamber.

The above objects are achieved in accordance with the teachings of the invention by an ion source which is for use in a mass spectrometer and which comprises: an ionization chamber; a pumping means for continuously pumping effluent; an inlet tube whose front end is located inside the ionization chamber to introduce the effluent delivered from the pumping means into the ionization chamber; a system for ionizing the effluent introduced into the ionization chamber; an exhaust pipe connected with the inlet tube; and a system for applying a pressure on the superfluous sample in the exhaust pipe employing a gaseous material which is at a substantially constant pressure. The system for applying pressure must be regulated to quickly respond to changing back pressure.

Other objects and features of the invention will appear in the course of the description thereof which follows.

BRIEF DESCRIPTION OF THE DRAWINGS

FIG. 7(*b*) is a cross-sectional view of an ion source which utilizes chemical ionization to ionize the effluent introduced into the ionization chamber.

DESCRIPTION OF THE PREFERRED EMBODIMENT

Figure 1:
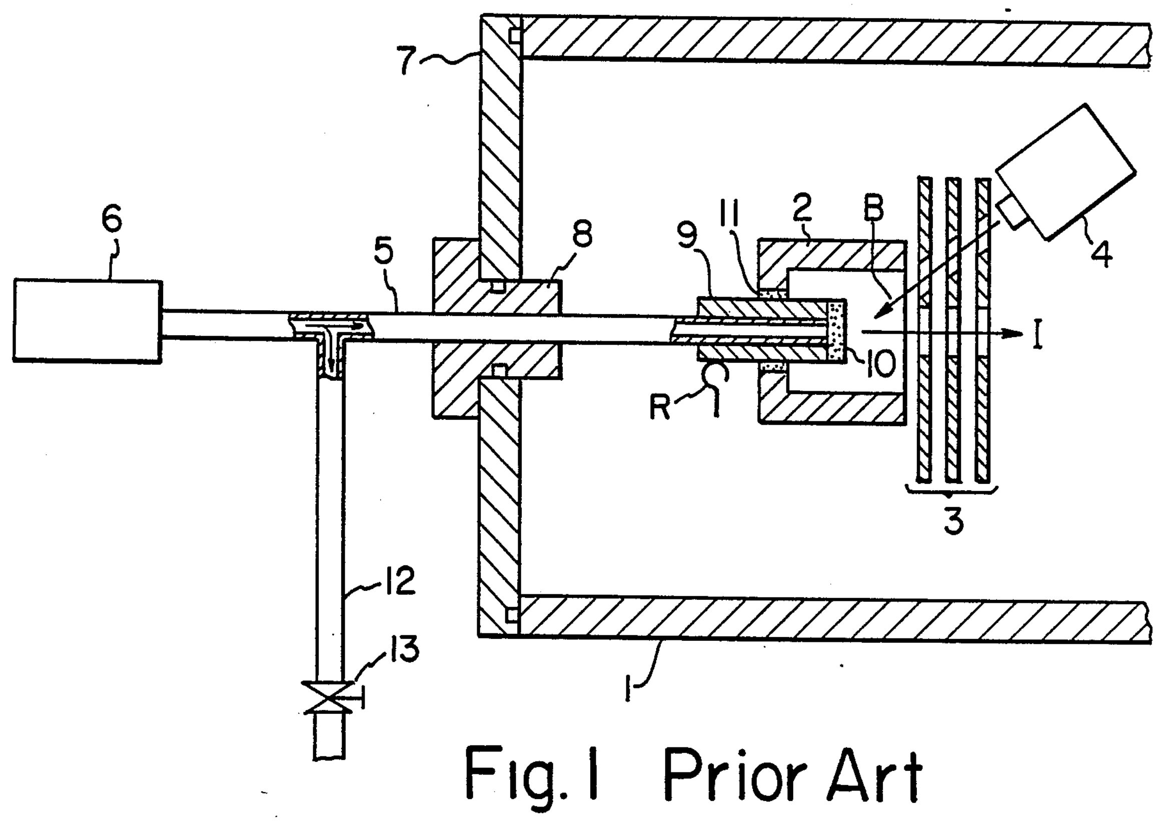
Fig. 1 Prior Art
FIG. 1 is a cross-sectional view of the conventional ion source.
Figure 2:
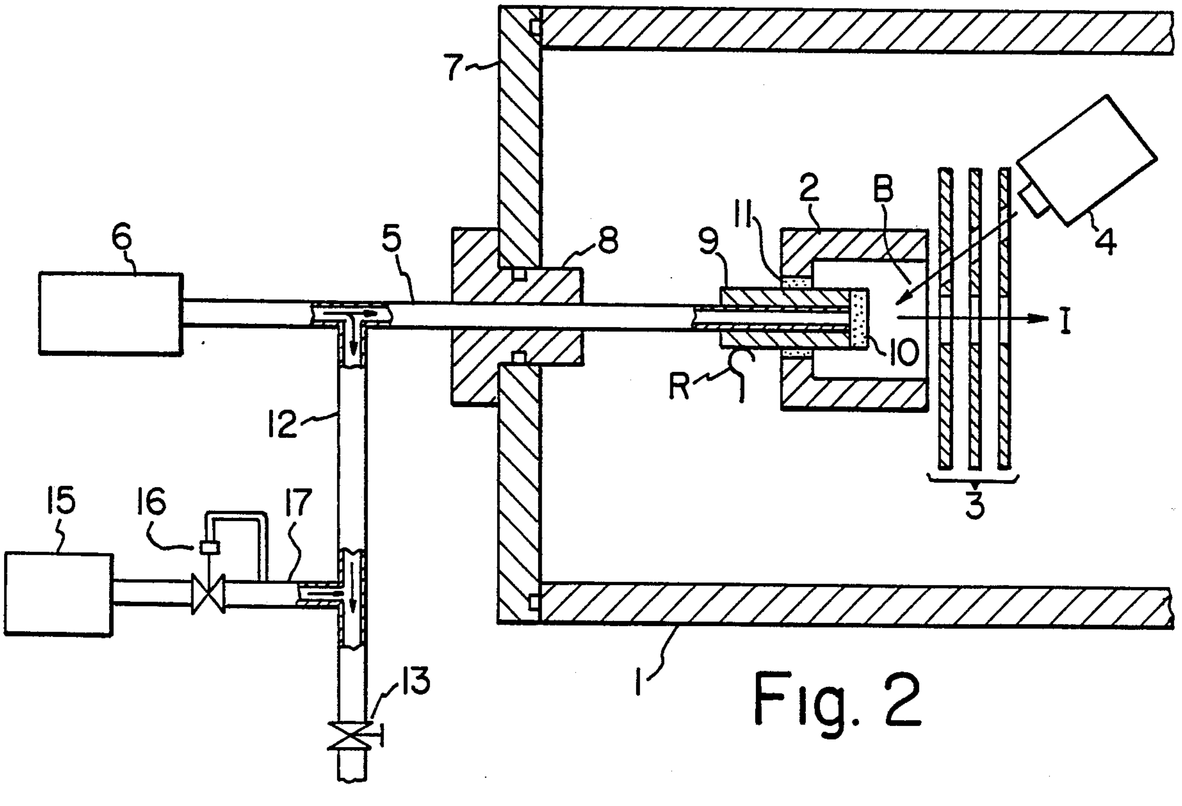
FIG. 2 is a cross-sectional view of an ion source according to the invention.

Referring to FIG. 2, there is shown an ion source according to the invention. It is to be noted that like components are indicated by like reference numerals throughout all the figures. The ion source shown in FIG. 2 is similar to the ion source shown in FIG. 1 except that a gas supply source 15, a constant-pressure valve 16, and a gas supply tube 17 are added. If necessary, a one-way valve can be inserted between the valve 16 and the exhaust pipe 12 to prevent the effluent flowing into the valve 16.

The gas supply source 15 supplies an inorganic gas, such as nitrogen, helium or argon gas, into the exhaust pipe 12 toward the control valve 13 at a flow rate of about 100 cc/min., for example, via the tube 17. A predetermined pressure is applied to the gas by the valve 16. Since the superfluous effluent and the gas at a constant pressure coexist inside of the exhaust passage, a constant pressure is applied on the superfluous effluent. As the result, the pressure inside the porous member 10 that is located at the front end of the inlet tube 5 can be retained constant even if the flow rate of the effluent from the liquid chromatograph 6 varies.

In the conventional structure shown in FIG. 1, the passage comprising the inlet tube 5 and the exhaust pipe 12 is filled with effluent, and the volume of the effluent that can be inserted in this passage is fixed. If the flow rate of the effluent from the chromatograph 6 varies at all, then the volume of the effluent existing in the passage will be increased or decreased. This greatly varies the pressure inside the passage, because the change in the volume of the effluent is very small. As a result, the flow rate of the effluent passing through the porous member 10 will vary greatly.

In the novel structure shown in FIG. 2, the gas maintained at a constant pressure coexists with the effluent within the exhaust passage. Since the volume of the gas can be changed easily, the volume of the effluent that can be inserted in the passage is not constant but rather can be varied in a given range. Because the gas is supplied at a constant pressure, the pressure inside the porous member 10 located at the front end of the inlet tube 5 is maintained constant even if the flow rate from the chromatograph 6 varies. Consequently, the flow rate of the effluent passing through the porous member 10 is also kept constant. When the pressure of the gas is changed, the pressure of the effluent at the location of the porous member 10 varies. Therefore, it is possible to control the flow rate of the effluent introduced into the ionization chamber via the porous member 10.

Figure 3:
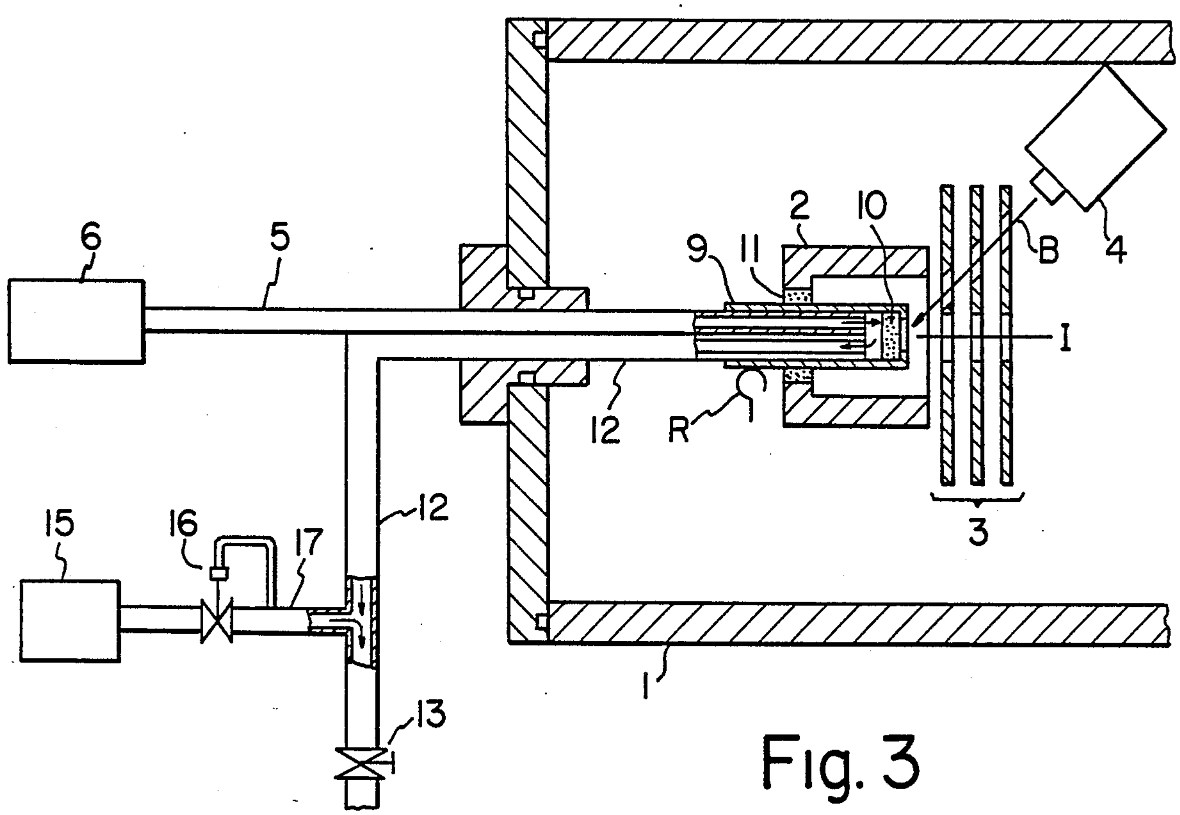
FIG. 3 is a cross-sectional view of another ion source according to the invention.

Referring next to FIG. 3, there is shown another ion source according to the invention. In this example, the exhaust pipe 12 is inserted into the ionization chamber 2 together with the inlet tube 5. The inlet tube 5 is connected with the exhaust pipe 12 within the chamber 2. Therefore, at the front end of the inlet tube 5, some of the effluent delivered from the chromatograph 6 enters the porous member 10, while the remaining effluent is directed into the exhaust pipe 12.

In the present invention, it is required that a pressure is applied on the effluent in the exhaust pipe by employing a gas at a constant pressure. This requirement can be also met by the structure shown in FIG. 4, where the exhaust pipe 12 is connected to an airtight container 18. The superfluous effluent is admitted into the container 18 via the exhaust pipe 12 and stored therein. The gas supply tube 17 is also connected to the container 18 to supply the gas into it at a given pressure. Thus, a constant pressure is applied on the superfluous effluent in the exhaust passage by the gas. If necessary, a leak valve can be attached to the container 18 for leaking the gas.

Figure 4:
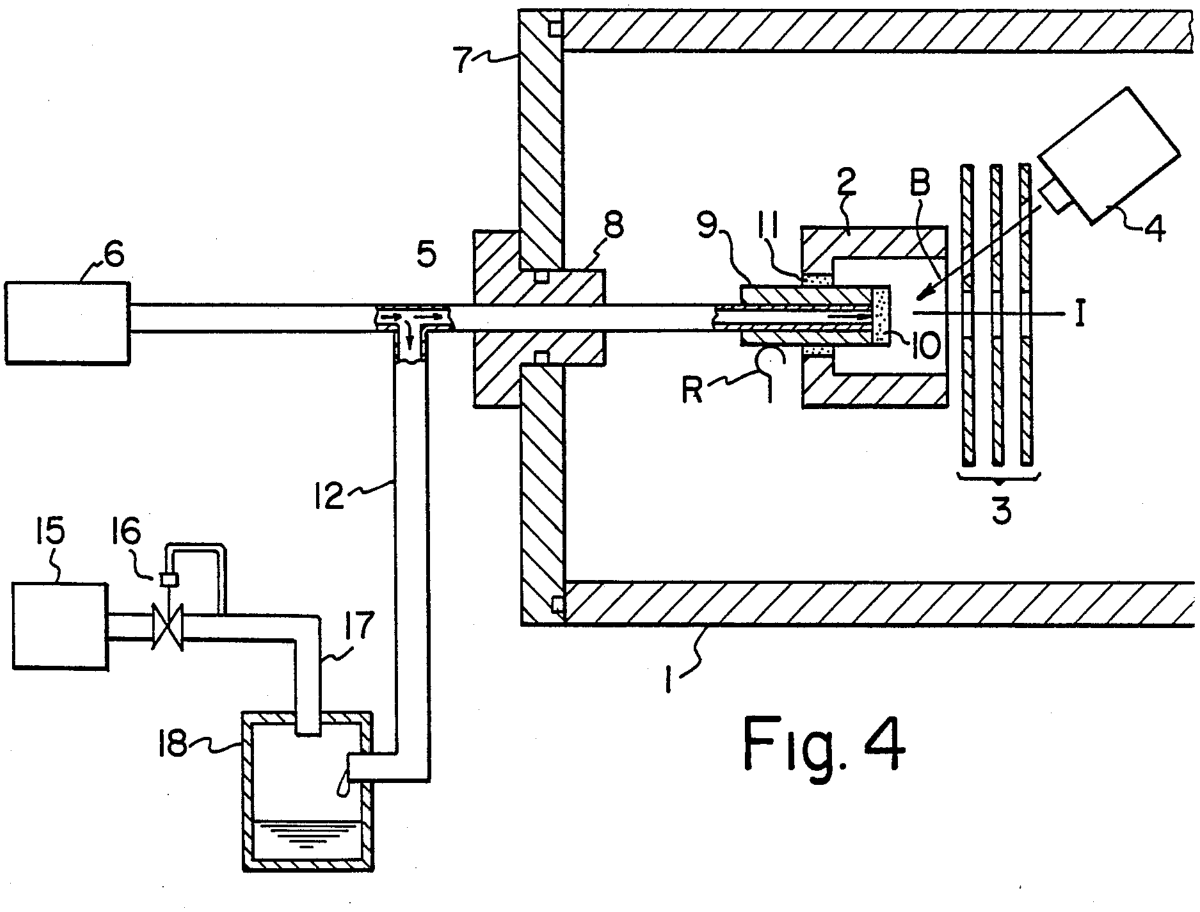
FIG. 4 is a view similar to FIGS. 2 and 3, but in which a structure for bringing column effluent into contact with a gas of a constant pressure is also shown.
Figure 5:
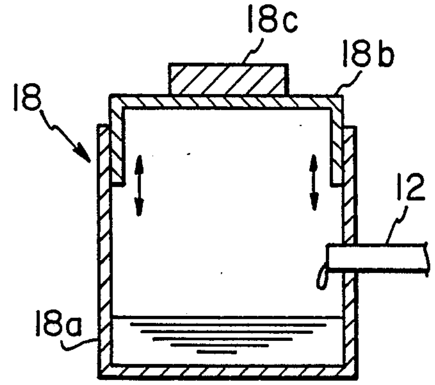
FIG. 5 is a cross-sectional view of an airtight container similar to the container shown in FIG. 4 but with some modifications.

Referring next to FIG. 5, there is shown an airtight container 18 which is similar to the container 18 shown in FIG. 4 except for the following: The container 18 shown in FIG. 5 comprises a reservoir portion 18*a*, a cover 18*b*, and a weight 18*c*. The cover 18*b* can be vertically slided without breaking the airtightness with the reservoir pattern 18*a*. The pressure of the gas can be set to any desired value by replacing the weight 18*c* with another. This structure is simple, because neither a gas supply source nor a constant-pressure valve is needed.

The pressure applied to the superfluous effluent in the exhaust passage may be set to a subatmospheric level. In this case, the gas supply source 15 shown in FIG. 4 is replaced by a vacuum pump.

Figure 6:
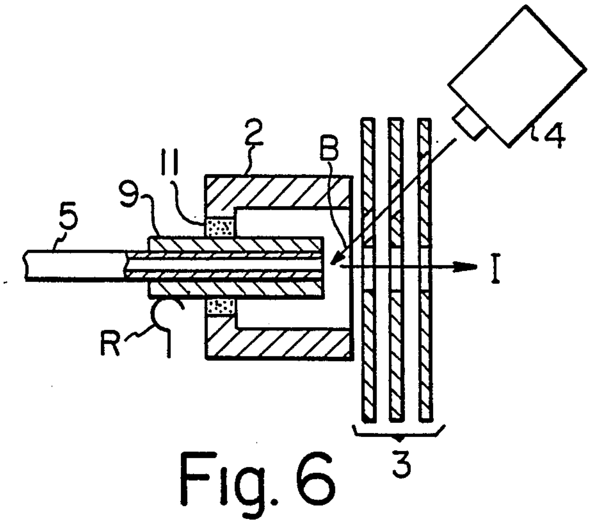
FIG. 6 is a cross-sectional view of an ion source which ionizes column effluent without using a porous member.

The porous member 10 mounted at the front end of the inlet tube 5 as described above is not essential to the invention. For example, as shown in FIG. 6, the porous member is omitted, and the effluent emerging from the front end of the inlet tube 5 is directly irradiated with the beam B produced from the beam generator 4.

The manner in which the effluent introduced into the ionization chamber is ionized is not limited to the aforementioned irradiation with beam but rather various methods can be employed as described below.

Figure 7A:
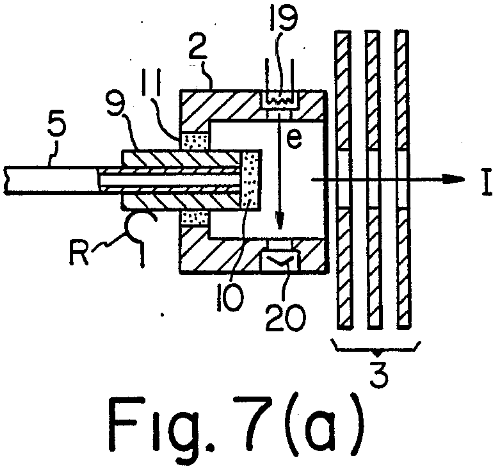
FIG. 7(*a*) is a cross-sectional view of an ion source which makes use of electron impact ionization to ionize the effluent introduced into the ionization chamber.
Figure 7B:
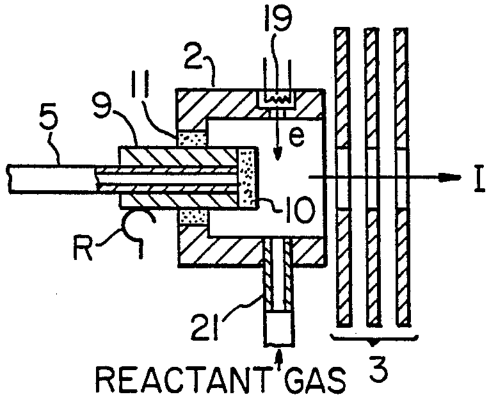

Referring to FIG. 7(*a*), there is shown an ion source making use of electron impact ionization. This source has a filament 19 for producing an electron beam e that passes through the ionization chamber 2 into a trap 20. The effluent evaporating from the surface of the porous member 10 is ionized by the electron beam e.

Referring to FIG. 7(*b*), there is shown an ion source utilizing chemical ionization. This source is equipped with an inlet tube 21 for introducing reactant gas into the ionization chamber 2. A filament 19 produces an electron beam e which is directed into the ionization chamber 2. The pressure inside the ionization chamber 2 is maintained at a pressure adapted for chemical ionization, say of the order of 1 Torr. The reactant gas is first ionized by the electron beam e. The resulting ions chemically react with the effluent evaporating from the surface of the porous member 10, whereby the effluent is ionized. Where the solvent contained in the effluent is used as reactant gas, the inlet tube 21 is dispensed with.

As described above in detail, the present invention provides a means for applying a pressure on the liquid sample in an exhaust passage that is on the downstream side of a splitter. As the result, a mass spectrometer ion source is provided which can stabilize the flow rate of the liquid sample continuously introduced into the ionization chamber.

Having thus described the invention with the detail and particularity required by the Patent Laws, what is claimed and desired to be protected by Letters Patent is set forth in the following claims:

1. An ion source for use in a mass spectrometer, said ion source comprising:

an ionization chamber;

a pump for continuously pumping liquid sample;

an inlet tube whose front end is located inside the ionization chamber to introduce the liquid sample delivered from the pump into the ionization chamber;

a means for ionizing a sample introduced into the ionization chamber;

an exhaust pipe connected with the inlet tube to direct superfluous liquid so said liquid does not enter the ionization chamber;

a quick responding means for applying a substantially constant pressure on the superfluous sample in the exhaust pipe by employing a gaseous material which is maintained at a substantially constant pressure; and means for changing the substantially constant pressure for varying the flow rate of the liquid sample introduced into the ionization chamber.

2. The ion source of claim 1, further comprising a porous member mounted to the inlet tube so as to plug the open end of the inlet tube.

3. The ion source of claim 1, wherein said substantially constant pressure is changeable for varying the flow rate of the liquid sample introduced into the ionization chamber.

4. The ion source of claim 1, wherein said pumping means is a liquid chromatograph.

5. The ion source of claim 1, wherein said exhaust pipe is connected with the inlet tube at the position outside the ionization chamber.

6. The ion source of claim 1, wherein said exhaust pipe is connected with the front end of the inlet tube.

7. An ion source for use in a mass spectrometer, said ion source comprising:

an ionization chamber;

a pump for continuously pumping liquid sample;

an inlet tube whose front end is located inside the ionization chamber to introduce the liquid sample delivered from the pump into the ionization chamber;

a means for ionizing the sample introduced into the ionization chamber;

an exhaust pipe connected with the inlet tube to direct superfluous liquid so said liquid does not enter the ionization chamber;

a gas source means for generating a gaseous material at a substantially constant pressure;

a gas supply tube connected with the exhaust pipe for supplying the gaseous material into the exhaust pipe; and means for changing the substantially constant pressure for varying the flow rate of the liquid sample introduced into the ionization chamber.

8. The ion source of claim 7, further comprising a porous member mounted to the inlet tube so as to plug the open end of the inlet tube.

9. The ion source of claim 7, wherein said substantially constant pressure is changeable for varying the flow rate of the liquid sample introduced in the ionization chamber.

10. The ion source of claim 7, wherein said pumping means is a liquid chromatograph.

11. The ion source of claim 7, wherein said exhaust pipe is connected with the inlet tube at the position outside the ionization chamber.

12. The ion source of claim 7, wherein said exhaust pipe is connected with the front end of the inlet tube.

13. An ion source for use in a mass spectrometer, said ion source comprising:

an ionization chamber;

a pump for continuously pumping liquid sample;

an inlet tube whose front end is located inside the ionization chamber to introduce the liquid sample delivered from the pump into the ionization chamber;

a means for ionizing the sample introduced into the ionization chamber;

an exhaust pipe connected with the inlet tube to direct superfluous liquid so said liquid does not enter the ionization chamber;

a container connected with the other end of the exhaust pipe, the inside of said container being filled with a gaseous material and maintained at a substantially constant pressure; and means for changing the substantially constant pressure for varying the flow rate of the liquid sample introduced into the ionization chamber.

14. The ion source of claim 13, further comprising a porous member mounted to the inlet tube so as to plug the open end of the inlet tube.

15. The ion source of claim 13, wherein said substantially constant pressure is changeable for varying the flow rate of the liquid sample introduced into the ionization chamber.

16. The ion source of claim 13, further including a gas source means for generating a gaseous material at a substantially constant pressure and a gas supply tube connected with the container for supplying said gaseous material into said container.

17. The ion source of claim 13, further including a leak valve connected with the container for leaking out the gaseous material.

18. The ion source of claim 13, wherein said pumping means is a liquid chromatograph.

19. The ion source of claim 13, wherein said exhaust pipe is connected with the inlet tube at the position outside the ionization chamber.

20. The ion source of claim 13, wherein said exhaust pipe is connected with the front end of the inlet tube.

* * * * *

UNITED STATES PATENT AND TRADEMARK OFFICE

CERTIFICATE OF CORRECTION

PATENT NO. : 4,794,253

DATED : December 27, 1988

INVENTOR(S) : Tatsuji Kobayashi

It is certified that error appears in the above-identified patent and that said Letters Patent is hereby corrected as shown below:

Column 1 Line 41 "μl" should read --μℓ--.

Column 1 Line 43 "μl" should read --μℓ--.

Column 1 Line 55 "μl" should read --μℓ-.

Column 1 Line 57 (both occurrences) " μl" should read --μℓ--.

Column 1 Line 59 "μl" should read --μℓ-.

Column 1 Line 64 "μl" should read --μℓ-.

Column 3 Line 67 "pattern" should read --portion--.

Signed and Sealed this

Twelfth Day of September, 1989

*Attest:*

DONALD J. QUIGG

*Attesting Officer* *Commissioner of Patents and Trademarks*